United States Patent
Nishiura et al.

(10) Patent No.: US 10,647,866 B2
(45) Date of Patent: May 12, 2020

(54) WATER-BASED INK FOR INK-JET RECORDING AND INK-JET RECORDING METHOD

(71) Applicant: Brother Kogyo Kabushiki Kaisha, Nagoya-shi, Aichi-ken (JP)

(72) Inventors: Miki Nishiura, Toyoake (JP); Mitsunori Maeda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/120,761

(22) Filed: Sep. 4, 2018

(65) Prior Publication Data

US 2019/0092954 A1   Mar. 28, 2019

(30) Foreign Application Priority Data

Sep. 26, 2017  (JP) .................. 2017-185351

(51) Int. Cl.
| | |
|---|---|
| C09D 11/326 | (2014.01) |
| C09D 11/106 | (2014.01) |
| C09D 11/38 | (2014.01) |
| B41M 7/00 | (2006.01) |
| C09D 11/107 | (2014.01) |
| B41J 11/00 | (2006.01) |
| C09D 11/023 | (2014.01) |
| B41M 5/00 | (2006.01) |
| C09D 11/037 | (2014.01) |
| C09D 11/322 | (2014.01) |

(52) U.S. Cl.
CPC ........... *C09D 11/326* (2013.01); *B41J 11/002* (2013.01); *B41M 5/0023* (2013.01); *B41M 7/009* (2013.01); *C09D 11/023* (2013.01); *C09D 11/037* (2013.01); *C09D 11/106* (2013.01); *C09D 11/107* (2013.01); *C09D 11/322* (2013.01); *C09D 11/38* (2013.01)

(58) Field of Classification Search
CPC .................................................. C09D 11/38
See application file for complete search history.

(56) References Cited

U.S. PATENT DOCUMENTS

| | | | | |
|---|---|---|---|---|
| 2012/0293578 | A1* | 11/2012 | Shiono | C09D 11/322 347/14 |
| 2015/0232694 | A1* | 8/2015 | Okuyama | C09D 175/04 347/100 |
| 2017/0029645 | A1* | 2/2017 | Iuchi | C09D 11/40 |
| 2017/0174919 | A1* | 6/2017 | Kido | C09D 11/36 |

FOREIGN PATENT DOCUMENTS

JP     2014-019811 A     2/2014

* cited by examiner

*Primary Examiner* — Shelby L Fidler
(74) *Attorney, Agent, or Firm* — Banner & Witcoff, Ltd.

(57) ABSTRACT

A water-based ink for ink-jet recording includes: a resin-dispersed pigment; an emulsion of a vinyl chloride-acrylic copolymer having a glass transition temperature of equal to or more than 50° C.; an anionic surfactant having only one anion group in a molecule thereof; and water. A ratio (S/E) of a blending amount (S) of the anionic surfactant to a solid content blending amount (E) of the emulsion of the vinyl chloride-acrylic copolymer in an entire amount of the water-based ink is equal to or more than 0.2.

20 Claims, 2 Drawing Sheets

WATER-BASED INK FOR INK-JET RECORDING AND INK-JET RECORDING METHOD

CROSS REFERENCE TO RELATED APPLICATION

The present application claims priority from Japanese Patent Application No. 2017-185351 filed on Sep. 26, 2017, the disclosure of which is incorporated herein by reference in its entirety.

BACKGROUND OF THE INVENTION

Field of the Invention

The present invention is related to a water-based ink for ink-jet recording and an ink-jet recording method.

Description of the Related Art

As a water-based ink for ink-jet recording having great fixing performance (fixability) onto coated paper, there is suggested a water-based ink containing a vinyl chloride-acrylic copolymer (Japanese Patent Application Laid-open No. 2014-19811).

In order to fix the water-based ink containing the vinyl chloride-acrylic copolymer onto the coated paper, for example, the water-based ink is required to be heated and dried at a high temperature for a long time.

In view of the above, an object of the present teaching is to provide a water-based ink for ink-jet recording that can be fixed onto coated paper by being dried at a low temperature in a short time.

SUMMARY OF THE INVENTION

According to a first aspect of the present teaching, there is provided a water-based ink for ink-jet recording, including:

a resin-dispersed pigment;

an emulsion of a vinyl chloride-acrylic copolymer having a glass transition temperature of equal to or more than 50° C.;

an anionic surfactant having only one anion group in a molecule thereof; and water, wherein a ratio (S/E) of a blending amount (S) of the anionic surfactant to a solid content blending amount (E) of the emulsion of the vinyl chloride-acrylic copolymer in an entire amount of the water-based ink is equal to or more than 0.2.

According to a second aspect of the present teaching, there is provided an ink-jet recording method, including:

jetting the water-based ink defined in the first aspect onto a recording medium in accordance with an ink-jet system; and heating a portion, of the recording medium, onto which the water-based ink has been jetted.

DESCRIPTION OF THE EMBODIMENTS

Figure 1:
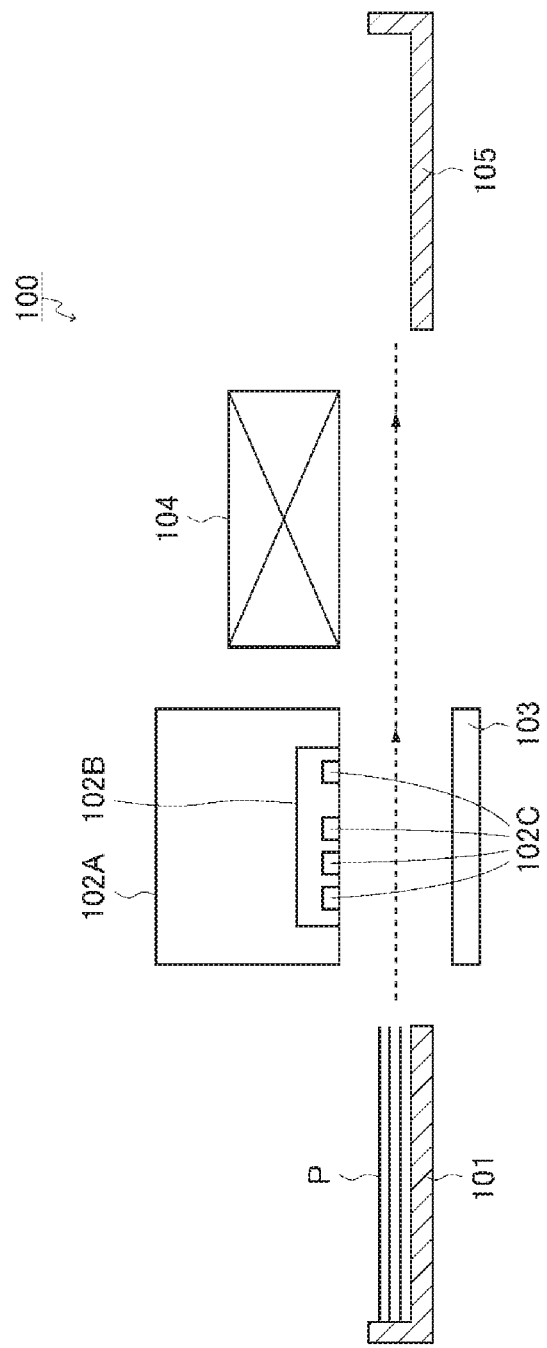
FIG. 1 schematically depicts an exemplary configuration of an ink-jet recording apparatus of the present teaching.

In the present teaching, "coated paper" is paper obtained by coating regular paper made mainly from pulp, such as high-grade print paper and middle-grade print paper, with a coating agent. The coating agent is applied to the regular paper to improve its smoothness, whiteness, brightness, and the like. The coated paper is exemplified by high-grade coated paper, middle-grade coated paper, and the like. A water-based ink for ink-jet recording (hereinafter also referred to as "a water-based ink" or "an ink") and an ink-jet recording method of the present teaching can be preferably used for ink-jet recording on the coated paper. The present teaching, however, is not limited thereto. In addition to the coated paper, the present teaching is applicable to ink-jet recording on any other recording medium, such as regular paper, glossy paper, and mat paper.

The water-based ink of the present teaching is explained. The water-based ink of the present teaching contains colorant and water.

The colorant contains a resin-dispersed pigment (resin-dispersible pigment, resin dispersion type pigment). The resin-dispersed pigment is dispersible in water by using, for example, a pigment dispersing resin (resin dispersant). The resin-dispersed pigment is not particularly limited, which is exemplified, for example, by carbon black, an inorganic pigment, and an organic pigment. The carbon black is exemplified, for example, by furnace black, lamp black, acetylene black, and channel black. The inorganic pigment is exemplified, for example, by titanium oxide, iron oxide-based inorganic pigments, and carbon black-based inorganic pigments. The organic pigment is exemplified, for example, by azo-pigments such as azo lake, insoluble azo-pigment, condensed azo-pigment, and chelate azo-pigment; polycyclic pigments such as phthalocyanine pigment, perylene and perynon pigments, anthraquinone pigment, quinacridone pigment, dioxadine pigment, thioindigo pigment, isoindolinone pigment, and quinophthalone pigment; dye lake pigments such as basic dye type lake pigment and acid dye type lake pigment; nitro pigments; nitroso pigments; and aniline black daylight fluorescent pigment. In addition to the above-listed examples, the resin-dispersed pigment can be exemplified, for example, by C. I. Pigment Blacks 1, 6, and 7; C. I. Pigment Yellows 1, 2, 3, 12, 13, 14, 15, 16, 17, 55, 74, 78, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 209, 221, 222, 224, and 238; C. I. Pigment Violets 19 and 196; C. I. Pigment Blues 1, 2, 3, 15, 15:1, 15:2, 15:3, 15:4, 16, 22, and 60; C. I. Pigment Greens 7 and 36; and solid solutions of the above-listed pigments.

The resin dispersant is exemplified, for example, by that containing at least one of methacrylic acid and acrylic acid as a monomer. The resin dispersant may be, for example, a commercially available product. The resin dispersant may further contain, for example, styrene and vinyl chloride as a monomer. Examples of the commercially available product include "JOHNCRYL (trade name) 611" (weight-average molecular weight: 8,100, acid value: 53 mgKOH/g), "JOHNCRYL (trade name) 60" (weight-average molecular weight: 8,500, acid value: 215 mgKOH/g), "JOHNCRYL (trade name) 586", "JOHNCRYL (trade name) 687", "JOHNCRYL (trade name) 63", and "JOHNCRYL (trade name) HPD296" produced by BASF Corporation (the former Johnson Polymer L.L.C.); "Disperbyk 190" and "Disperbyk 191" produced by BYK additives & Instruments; and "SOLSPERSE 20000" and "SOLSPERSE 27000" produced by Zeneca.

The solid content blending amount of the resin-dispersed pigment (pigment solid content amount) in the entire amount of the water-based ink is not particularly limited, and it may be appropriately determined based on a desired optical density, chromaticness, and the like. The pigment solid content amount is, for example, in a range of 0.1 to 20% by weight, in a range of 1 to 15% by weight, or in a range of 2 to 10% by weight. The pigment solid content amount indicates the weight of only the pigment, namely, it does not include the weight of the resin dispersant. Only one kind of the resin-dispersed pigment as described above may be used singly, or two or more kinds of the resin-dispersed pigments may be used in combination.

The blending amount of the pigment dispersing resin (resin dispersant) in the entire amount of the ink is not particularly limited, and it may be appropriately determined based on the kind of the resin-dispersed pigment, the pigment solid content amount, and the like. The ratio of the solid content weight of the resin dispersant to the solid content weight of the resin-dispersed pigment in the water-based ink is, for example, in a range of 5 to 100% by weight or in a range of 10 to 50% by weight.

In addition to the resin-dispersed pigment, the water-based ink may or may not further contain any other colorant, such as a pigment and a dye. In order to improve the fixing performance (fixability) to the coated paper, the main component of the colorant(s) is preferably the resin-dispersed pigment. The ratio of the blending amount of the resin-dispersed pigment to the total blending amount of the colorant(s) is, for example, in a range of 95 to 100% by weight or in a range of 98 to 100% by weight.

The water is preferably ion-exchanged water or pure water (purified water). The blending amount of the water in the entire amount of the water-based ink may be, for example, a balance of the other components.

The water-based ink further contains a vinyl chloride-acrylic copolymer emulsion (an emulsion of a vinyl chloride-acrylic copolymer) and an anionic surfactant having only one anion group in its molecule.

The vinyl chloride-acrylic copolymer emulsion is a system in which emulsified particles of the vinyl chloride-acrylic copolymer are dispersed in water (water may contain a hydrophilic solvent). Here, the particles of the vinyl chloride-acrylic copolymer in the vinyl chloride-acrylic copolymer emulsion are described as "emulsion particles (emulsified particles) of the vinyl chloride-acrylic copolymer" or simply described as "emulsion particles (emulsified particles)". Namely, the water-based ink contains the emulsion particles of the vinyl chloride-acrylic copolymer.

The glass transition temperature (Tg) of the vinyl chloride-acrylic copolymer forming the emulsion particles is equal to or more than 50° C. When the glass transition temperature (Tg) is less than 50° C., a film of the vinyl chloride-acrylic copolymer may be formed in the water-based ink before ink jetting, which may cause jetting failure and reduce the fixing performance to coated paper. Further, since the recording medium (coated paper) is dried at a relatively low drying temperature in a fixing step described below, the glass transition temperature (Tg) is, for example, preferably equal to or less than 200° C. The glass transition temperature (Tg) is, for example, in a range of 57 to 73° C.

The vinyl chloride-acrylic copolymer emulsion may be prepared privately or independently. The vinyl chloride-acrylic copolymer emulsion may be, for example, a commercially available product. The vinyl chloride-acrylic copolymer emulsion may be, for example, a core-shell type emulsion. The core-shell type emulsion is exemplified, for example, by that in which the core of each emulsion particle is polymeric and the shell of each emulsion particle is a surfactant or an emulsifier. The core-shell type emulsion, however, is not limited thereto. The core-shell type emulsion can be prepared, for example, by any well-known method such as emulsion polymerization using a surfactant and emulsion polymerization in the presence of a polymer emulsifier prepared in advance. The polymer emulsifier forms a shell that is an outer layer of each emulsion particle, and a copolymer formed in a subsequent process forms a core that is an inner layer of each emulsion particle. The core-shell type emulsion may be prepared, for example, by any other method than the emulsion polymerization, such as radical polymerization reaction. Examples of the commercially available product include "VINYBLAN (trade name) 700" (Tg: 70° C., active ingredient concentration: 30% by weight), "VINYBLAN (trade name) 701" (Tg: 73° C., active ingredient concentration: 30% by weight), and "VINYBLAN (trade name) 745" (Tg: 57° C., active ingredient concentration: 30% by weight) produced by Nissin Chemical Industry Co., Ltd.

The anionic surfactant is not particularly limited provided that only one anion group is included in its molecule. The anionic surfactant may be, for example, a commercially available product. Examples of the commercially available product include "BEAULIGHT (trade name) ECA" (sodium polyoxyethylene tridecyl ether acetate) and "BEAULIGHT (trade name) LCA25N" (sodium polyoxyethylene lauryl ether acetate) produced by Sanyo Chemical Industries, Ltd.; "ENAGICOL (trade name) EC-30" (sodium polyoxyethylene lauryl ether acetate) and "SUNNOL (trade name) NL1430" (sodium polyoxyethylene alkyl ether sulfate) produced by Lion Specialty Chemicals Co., Ltd; and "NEOPELEX (trade name) G25" (sodium dodecylbenzenesulfonate, soft-type) produced by Kao Corporation.

The anionic surfactant is preferably a carboxylic acid type surfactant. Using the carboxylic acid type surfactant results in a water-based ink having a satisfactory fixing performance to coated paper and a satisfactory resistance to water. Among the above commercially available products, "BEAULIGHT (trade name) ECA", "BEAULIGHT (trade name) LCA25N", and "ENAGICOL (trade name) EC-30" are the carboxylic acid type surfactants.

The anionic surfactant has, for example, carbon atoms of 6 to 20, 10 to 16, or 12 to 13. In case that the anionic surfactant includes an alkyl group, the number of carbon atoms of the anionic surfactant means, for example, the number of carbon atoms of the alkyl group, and does not include the number of carbon atoms of other groups except for the alkyl group.

For the purpose of improving the fixing performance to coated paper and the resistance to water of the water-based ink, the anionic surfactant preferably contains an oxyethylene group. From the same viewpoint, the anionic surfactant is preferably polyoxyethylene alkyl ether acetate.

The solid content blending amount (E) of the vinyl chloride-acrylic copolymer emulsion and the blending amount (S) of the anionic surfactant in the entire amount of the water-based ink satisfy $S/E \geq 0.2$ to improve the fixing performance to coating paper. In order to further improve the fixing performance to coated paper, the solid content blending amount (E) and the blending amount (S) preferably satisfy $S/E=0.2$ to 0.6, more preferably satisfy $S/E=0.2$ to 0.4. The solid content blending amount (E) of the vinyl chloride-acrylic copolymer emulsion indicates the solid content blending amount of the emulsion particles in the entire amount of the water-based ink.

The solid content blending amount (E) and the blending amount (S) may be appropriately adjusted to satisfy S/E≥0.2. The solid content blending amount (E) is for example, in a range of 0.1 to 10% by weight, in a range of 1 to 8% by weight, or in a range of 3 to 6% by weight. The blending amount (S) is, for example, in a range of 0.02 to 4% by weight, in a range of 0.2 to 3.2% by weight, or in a range of 0.6 to 2.4% by weight.

The water-based ink that contains a predefined amount of the anionic surfactant and the emulsion particles of the vinyl chloride-acrylic copolymer having a glass transition temperature of equal to or more than 50° C. can be fixed onto the coated paper by being dried at a low temperature in a short time. The mechanism improving the fixing performance to coated paper is assumed, for example, as follows. Namely, it is estimated that adding the anionic surfactant to the water-based ink facilitates cleavage of shells of emulsion particles in the vinyl chloride-acrylic copolymer emulsion, making it possible to fix the water-based ink onto the coated paper at a low temperature in a short time. This mechanism, however, is just an assumption and the present teaching is not limited thereto. The drying temperature is explained in detail when an ink-jet recording method of the present teaching is explained below.

The water-based ink may further contain a water-soluble organic solvent. The water-soluble organic solvent is exemplified, for example, by a humectant that prevents the water-based ink from drying at an end of a nozzle in the ink-jet head and a penetrant that adjusts the drying velocity on the recording medium.

The humectant is not particularly limited, which is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, and trimethylolethane; 2-pyrrolidone; N-methyl-2-pyrrolidone; and 1,3-dimethyl-2-imidazolidinone. The polyalkylene glycol is exemplified, for example, by polyethylene glycol and polypropylene glycol. The alkylene glycol is exemplified, for example, by ethylene glycol, propylene glycol, butylene glycol, diethylene glycol, triethylene glycol, dipropylene glycol, tripropylene glycol, thiodiglycol, and hexylene glycol. Only one kind of the humectant as described above may be used singly, or two or more kinds of the humectants may be used in combination. Among the above, the polyvalent alcohol such as alkylene glycol and glycerol is preferably used.

The blending amount of the humectant in the entire amount of the water-based ink is, for example, in a range of 0 to 95% by weight, in a range of 5 to 80% by weight, or in a range of 5 to 50% by weight.

The penetrant is exemplified, for example, by glycol ether. The glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. Only one kind of the penetrant as described above may be used singly, or two or more kinds of the penetrants may be used in combination.

The blending amount of the penetrant in the entire amount of the water-based ink is, for example, in a range of 0 to 20% by weight, in a range of 0 to 15% by weight, or in a range of 1 to 6% by weight.

The water-based ink may further contain a conventionally known additive, as necessary. The additive is exemplified, for example, by surfactants other than the anionic surfactant, pH-adjusting agents, viscosity-adjusting agents, surface tension-adjusting agents, and fungicides. The viscosity-adjusting agents are exemplified, for example, by polyvinyl alcohol and cellulose.

The water-based ink may be prepared, for example, by mixing the resin-dispersed pigment, the water, the vinyl chloride-acrylic copolymer emulsion, the anionic surfactant, and optionally other additive component(s) as necessary uniformly or homogeneously through any conventionally known method and then removing undissolved matters by a filter or the like.

As described above, the water-based ink for ink-jet recording of the present teaching contains, in addition to the vinyl chloride-acrylic copolymer emulsion of which glass transition temperature is in a predefined range, a predefined amount of the anionic surfactant having only one anion group in its molecule. This makes it possible to fix the water-based ink onto the coated paper at a low temperature in a short time.

Next, an ink-jet recording apparatus and an ink-jet recording method of the present teaching are explained.

The ink-jet recording apparatus of the present teaching is an ink-jet recording apparatus characterized by including: an ink storing section storing an ink; an ink-jetting mechanism configured to jet the ink stored in the ink storing section; and a drying mechanism configured to heat and dry a recording portion recorded by using the ink, wherein the ink stored in the ink storing section is the water-based ink for ink-jet recording of the present teaching.

The ink-jet recording method of the present teaching is characterized by including: a recording step of performing recording by jetting a water-based ink onto a recording medium in accordance with an ink-jet system; and a fixing step of fixing the water-based ink onto the recording medium by use of a drying mechanism configured to heat and dry a recording portion of the recording medium, wherein the water-based ink for ink-jet recording of the present teaching is used as the water-based ink in the recording step.

The ink-jet recording method of the present teaching can be performed, for example, by using the ink-jet recording apparatus of the present teaching. The recording includes printing a letter (text), printing an image, printing, etc.

Figure 2:
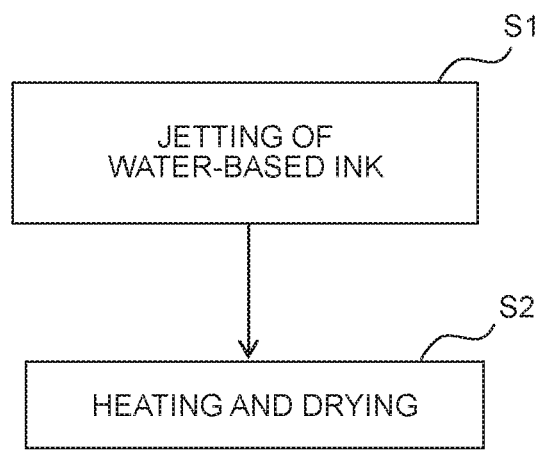
FIG. 2 is a flow chart indicating a recording method of the present teaching.

FIG. 1 schematically depicts an exemplary configuration of the ink-jet recording apparatus of the present teaching. FIG. 2 is a flow chart indicating a recording method of the present teaching. As depicted in FIG. 1, an ink-jet recording apparatus 100 includes a feed tray 101, a conveyance mechanism (not depicted) such as a roller, recording mechanisms 102A and 102B, a platen 103, a drying mechanism 104, a discharge tray 105, and ink storing sections (not depicted) such as ink cartridges or ink tanks. The feed tray 101 can support recording mediums P (e.g., pieces of the coated paper) stacked thereon.

A conveyance route (not depicted) by use of a guide member is formed in the ink-jet recording apparatus 100. As indicated by a broken line in FIG. 1, the recording medium P is conveyed from the feed tray 101 to the discharge tray 105 by use of the conveyance mechanism and the conveyance route.

The recording mechanism includes a carriage 102A and an ink-jet head (ink jetting mechanism) 102B. The carriage 102A is supported by two guide rails (not depicted) extending vertically to a conveyance direction of the recording medium P. The two guide rails are supported by a casing (not depicted) of the ink-jet recording apparatus 100. The carriage 102A is connected to a well-known belt mechanism (not depicted) provided in the two guide rails. The belt mechanism is driven by a carriage motor (not depicted). The carriage motor is driven to reciprocatingly move the carriage 102A connected to the belt mechanism in a vertical direction with respect to the conveyance direction of the recording medium P.

Further, four ink tubes (not depicted) connecting the ink storing sections and the ink-jet head 102B and a flexible flat cable (not depicted) electrically connecting a control board (a controller, not depicted) and the ink-jet head 102B extend from the carriage 102A. Four colors of water-based inks (yellow, magenta, cyan, and black) stored in the ink storing sections are supplied to the ink-jet head 102B via the four ink tubes. At least one of the four water-based inks is the water-based ink for ink-jet recording of the present teaching. A control signal outputted from the control board is transmitted to the ink-jet head 102B via the flexible flat cable.

As depicted in FIG. 1, the carriage 102A carries the ink-jet head 102B. Nozzles 102C are formed in a lower surface of the ink-jet head 102B. A front end of each nozzle 102C is exposed from the carriage 102A and the lower surface of the ink-jet head 102B. The ink-jet head 102B includes an actuator (not depicted) that applies force for jetting the water-based ink, which is supplied from the ink storing section to the ink-jet head 102B via the ink tube. The actuator may be an actuator of any system, such as a piezoelectric element system, a thermal ink-jet system, and an electrostatic attraction system. The ink-jet head 102B jets fine ink droplets of the water-based ink from the nozzles 102C during a process in which the carriage 102A reciprocates in the vertical direction with respect to the conveyance direction of the recording medium P (step S1 in FIG. 2). Accordingly, an image is recorded on the recording medium P. The platen 103, which is disposed to face the recording mechanism, supports the recording medium P conveyed from the feed tray 101.

The drying mechanism 104 heats and dries a recording portion of the recording medium P (step S2 in FIG. 2). The drying temperature is, for example, a temperature in a range of 0.2 to 4 times of the glass transition temperature (Tg) of the vinyl chloride-acrylic copolymer emulsion (the glass transition temperature (Tg) of the vinyl chloride-acrylic copolymer forming the emulsion particles). The drying temperature may be a temperature in a range of 0.2 to 3 times or 0.4 to 2 times of the glass transition temperature of the vinyl chloride-acrylic copolymer. The drying temperature may be appropriately adjusted by changing settings of the drying mechanism 104. Specifically, the drying temperature may be in a range of 20 to 200° C., in a range of 20 to 150° C., or in a range of 40 to 100° C. The drying time may be also adjusted as appropriate by changing the settings of the drying mechanism 104. For example, the drying time may be in a range of a second(s) exceeding 0 to equal to less than 300 seconds, in a range of 0.1 to 60 seconds, or in a range of 30 to 60 seconds. The water-based ink of the present teaching can be fixed onto the coated paper at a lower temperature in a shorter time than conventional water-based inks requiring the heating and drying at a high temperature for a long time. The drying mechanism 104 may be any mechanism capable of drying the recording portion. The recording portion may be dried by blowing, by heating, or by a combination of blowing and heating. Examples of the drying mechanism 104 include heating mechanisms such as commercially available IR heaters, ovens, belt conveyer ovens, irons, and hot presses, and heating and blowing mechanisms such as commercially available driers. A non-contact drying mechanism, such as the drier, the oven, and the belt conveyer oven, which heats and dries the recording portion of the recording medium P without contacting with the recording portion is preferably used.

The recording medium P after recording and drying is conveyed to the discharge tray 105.

EXAMPLES

Next, Examples of the present teaching are explained together with Comparative Examples. Note that the present teaching is not limited to and restricted by Examples and Comparative Examples described below.

[Preparation of Pigment Dispersion Liquids A and B]

Purified water was added to 20% by weight of a pigment (carbon black) and 7% by weight of a sodium hydroxide neutralized product of a styrene-acrylic acid copolymer (acid value 175 mgKOWH/g, molecular weight 10,000), so that the sum of them was 100% by weight, followed by being stirred (agitated) and mixed with each other. This mixture was put in a wet sand mill using zirconia beads with a diameter of 0.3 mm as a medium to perform dispersion treatment for six hours. After that, the zirconia beads were removed by a separator, and the mixture thus obtained was filtrated through a cellulose acetate filter (pore size 3.00 μm). Accordingly, the pigment dispersion liquid A was obtained. The pigment dispersion liquid B was obtained similarly to the pigment dispersion liquid A, except that 9% by weight of a sodium hydroxide neutralized product of a styrene-methacrylic acid copolymer (acid value 175 mgKOH/g, molecular weight 10,000) was used instead of 7% by weight of the sodium hydroxide neutralized product of the styrene-acrylic acid copolymer. Each of the styrene-acrylic acid copolymer and the styrene-methacrylic acid copolymer is a water-soluble polymer commonly used as a pigment dispersant.

Examples 1-9 and Comparative Examples 1 to 7

Ingredients, except for the pigment dispersion liquid A, the pigment dispersion liquid B, or CAB-O-JET (trade name) 300, which were included in Water-based ink composition (Table 1) were mixed uniformly or homogeneously; and thus an ink solvent was obtained. Subsequently, the ink solvent was added to the pigment dispersion liquid A, the pigment dispersion B, or CAB-O-JET (trade name) 300 dispersed in water, followed by being mixed uniformly. After that, the obtained mixture was filtrated through a cellulose acetate membrane filter (pore size 3.00 μm) produced by Toyo Roshi Kaisha, Ltd., and thus the water-based ink for ink-jet recording in each of Examples 1 to 9 and Comparative examples 1 to 7 as indicated in Table 1 was obtained. In Table 1, "Number" means the number of anion groups included in a molecule of the anionic surfactant.

With respect to the water-based inks of Examples 1 to 9 and Comparative examples 1 to 7, evaluation of fixing performance to coated paper was conducted by the following method.

<Evaluation Method of Fixing Performance to Coated Paper>

The water-based ink in each of Examples and Comparative Examples was applied to coated paper (product name: OK Top Coat Plus, produced by Oji Paper Co., Ltd.) by using a bar coater such that its application thickness was 3 μm. Accordingly, an application sample of each of Examples and Comparative Examples was prepared. Then, the application sample was dried at 40° C. for 60 seconds. After that, a surface of the application sample was rubbed by a cotton swab from the application portion of each of the water-based inks to a non-application portion. The rubbing off and stains in the application portion and the non-application portion were visually observed, and the evaluation was performed in accordance with the following evaluation criterion.

<Evaluation of Fixing Performance to Coated Paper and Evaluation Criterion>

A: Although the rubbing off was observed in 15% of the application portion after rubbed, but no stain was observed in the non-application portion;

B: Although the rubbing off was observed in 30% of the application portion after rubbed, but no stain was observed in the non-application portion;

C: The rubbing off was observed in the entire application portion after rubbed, and stains were observed in the non-application portion.

The water-based ink compositions and the evaluation results of evaluation of fixing performance to coated paper in Examples 1 to 9 and Comparative Examples 1 to 7 are indicated in Table 1.

TABLE 1

| | | | | Example | | | | |
|---|---|---|---|---|---|---|---|---|
| | | | | 1 | 2 | 3 | 4 | 5 |
| Water-based ink composition (% by weight) | Colorant | Pigment dispersion liquid A (*1) | | 5 | — | 5 | 5 | 5 |
| | | Pigment dispersion liquid B (*2) | | — | 5 | — | — | — |
| | | CAB-O-JET (trade name) 300 (*3) | | — | — | — | — | — |
| | Vinyl chloride-acrylic copolymer emulsion (E) | | Tg (° C.) | | | | | |
| | | VINYBLAN (trade name) 701 (*4) | 73 | 5 | 5 | — | — | 5 |
| | | VINYBLAN (trade name) 700 (*5) | 70 | — | — | 5 | — | — |
| | | VINYBLAN (trade name) 745 (*6) | 57 | — | — | — | 5 | — |
| | | VINYBLAN (trade name) 715S (*7) | 25 | — | — | — | — | — |
| | Humectant | Propylene glycol | | 25 | 25 | 25 | 25 | 25 |
| | Penetrant | Triethylene glycol-n-butyl ether | | 3 | 3 | 3 | 3 | 3 |
| | Nonionic surfactant | Olfine (trade name) E1010 (*8) | | 1 | 1 | 1 | 1 | 1 |
| | Anionic surfactant (S) | | Number | | | | | |
| | | BEAULIGHT (trade name) ECA (*9) | 1 | 1 | 1 | 1 | 1 | — |
| | | BEAULIGHT (trade name) LCA25N (*10) | 1 | — | — | — | — | 1 |
| | | SUNNOL (trade name) NL1430 (*11) | 1 | — | — | — | — | — |
| | | NEOPELEX (trade name) G25 (*12) | 1 | — | — | — | — | — |
| | | BEAULIGHT (trade name) ESS (*13) | 2 | — | — | — | — | — |
| | | DEMOL (trade name) NL (*14) | 2 or more | — | — | — | — | — |
| | Ampholytic surfactant | ENAGICOL (trade name) L-30AN (*15) | | — | — | — | — | — |
| | Water | | | balance | balance | balance | balance | balance |
| S/E | | | | 0.2 | 0.2 | 0.2 | 0.2 | 0.2 |
| Fixing performance to coated paper | | | | A | A | A | A | A |

| | | | | Example | | | |
|---|---|---|---|---|---|---|---|
| | | | | 6 | 7 | 8 | 9 |
| Water-based ink composition (% by weight) | Colorant | Pigment dispersion liquid A (*1) | | 5 | 5 | 5 | 5 |
| | | Pigment dispersion liquid B (*2) | | — | — | — | — |
| | | CAB-O-JET (trade name) 300 (*3) | | — | — | — | — |
| | Vinyl chloride-acrylic copolymer emulsion (E) | | Tg (° C.) | | | | |
| | | VINYBLAN (trade name) 701 (*4) | 73 | 5 | 5 | 5 | 5 |
| | | VINYBLAN (trade name) 700 (*5) | 70 | — | — | — | — |
| | | VINYBLAN (trade name) 745 (*6) | 57 | — | — | — | — |
| | | VINYBLAN (trade name) 715S (*7) | 25 | — | — | — | — |

TABLE 1-continued

|  |  |  |  |  |  |  |  |
|---|---|---|---|---|---|---|---|
|  | Humectant | Propylene glycol |  | 25 | 25 | 25 | 25 |
|  | Penetrant | Triethylene glycol-n-butyl ether |  | 3 | 3 | 3 | 3 |
|  | Nonionic surfactant | Olfine (trade name) E1010 (*8) |  | 1 | 1 | 1 | 1 |
|  | Anionic surfactant (S) |  | Number |  |  |  |  |
|  |  | BEAULIGHT (trade name) ECA (*9) | 1 | — | — | — | — |
|  |  | BEAULIGHT (trade name) LCA25N (*10) | 1 | 2 | 3 | — | — |
|  |  | SUNNOL (trade name) NL1430 (*11) | 1 | — | — | 1 | — |
|  |  | NEOPELEX (trade name) G25 (*12) | 1 | — | — | — | 1 |
|  |  | BEAULIGHT (trade name) ESS (*13) | 2 | — | — | — | — |
|  |  | DEMOL (trade name) NL (*14) | 2 or more | — | — | — | — |
|  | Ampholytic surfactant | ENAGICOL (trade name) L-30AN (*15) |  | — | — | — | — |
|  | Water |  |  | balance | balance | balance | balance |
| S/E |  |  |  | 0.4 | 0.6 | 0.2 | 0.2 |
| Fixing performance to coated paper |  |  |  | A | B | B | B |

|  |  |  |  | Comparative Example |  |  |  |  |
|---|---|---|---|---|---|---|---|---|
|  |  |  |  | 1 | 2 | 3 | 4 | 5 |
| Water-based ink composition (% by weight) | Colorant | Pigment dispersion liquid A (*1) |  | — | 5 | 5 | 5 | 5 |
|  |  | Pigment dispersion liquid B (*2) |  | — | — | — | — | — |
|  |  | CAB-O-JET (trade name) 300 (*3) |  | 5 | — | — | — | — |
|  | Vinyl chloride-acrylic copolymer emulsion (E) |  | Tg (° C.) |  |  |  |  |  |
|  |  | VINYBLAN (trade name) 701 (*4) | 73 | 5 | — | 5 | 5 | 5 |
|  |  | VINYBLAN (trade name) 700 (*5) | 70 | — | — | — | — | — |
|  |  | VINYBLAN (trade name) 745 (*6) | 57 | — | — | — | — | — |
|  |  | VINYBLAN (trade name) 715S (*7) | 25 | — | 5 | — | — | — |
|  | Humectant | Propylene glycol |  | 25 | 25 | 25 | 25 | 25 |
|  | Penetrant | Triethylene glycol-n-butyl ether |  | 3 | 3 | 3 | 3 | 3 |
|  | Nonionic surfactant | Olfine (trade name) E1010 (*8) |  | 1 | 1 | 1 | 1 | 1 |
|  | Anionic surfactant (S) |  | Number |  |  |  |  |  |
|  |  | BEAULIGHT (trade name) ECA (*9) | 1 | 1 | 1 | — | — | — |
|  |  | BEAULIGHT (trade name) LCA25N (*10) | 1 | — | — | — | — | — |
|  |  | SUNNOL (trade name) NL1430 (*11) | 1 | — | — | — | — | — |
|  |  | NEOPELEX (trade name) G25 (*12) | 1 | — | — | — | — | — |
|  |  | BEAULIGHT (trade name) ESS (*13) | 2 | — | — | — | — | 1 |
|  |  | DEMOL (trade name) NL (*14) | 2 or more | — | — | — | — | — |
|  | Ampholytic surfactant | ENAGICOL (trade name) L-30AN (*15) |  | — | — | — | 1 | — |
|  | Water |  |  | balance | balance | balance | balance | balance |
| S/E |  |  |  | 0.2 | 0.2 | 0 | 0 | 0.2 |
| Fixing performance to coated paper |  |  |  | C | C | C | C | C |

|  |  |  |  | Comparative Example |  |
|---|---|---|---|---|---|
|  |  |  |  | 6 | 7 |
| Water-based ink composition (% by weight) | Colorant | Pigment dispersion liquid A (*1) |  | 5 | 5 |
|  |  | Pigment dispersion liquid B (*2) |  | — | — |
|  |  | CAB-O-JET (trade name) 300 (*3) |  | — | — |
|  | Vinyl chloride-acrylic copolymer emulsion (E) |  | Tg (° C.) |  |  |
|  |  | VINYBLAN (trade name) 701 (*4) | 73 | 5 | 5 |
|  |  | VINYBLAN (trade name) 700 (*5) | 70 | — | — |
|  |  | VINYBLAN (trade name) 745 (*6) | 57 | — | — |
|  |  | VINYBLAN (trade name) 715S (*7) | 25 | — | — |

TABLE 1-continued

|   |   |   |   |   |
|---|---|---|---|---|
| Humectant | Propylene glycol | | 25 | 25 |
| Penetrant | Triethylene glycol-n-butyl ether | | 3 | 3 |
| Nonionic surfactant | Olfine (trade name) E1010 (*8) | | 1 | 1 |
| Anionic surfactant (S) | | Number | | |
| | BEAULIGHT (trade name) ECA (*9) | 1 | — | 0.5 |
| | BEAULIGHT (trade name) LCA25N (*10) | 1 | — | — |
| | SUNNOL (trade name) NL1430 (*11) | 1 | — | — |
| | NEOPELEX (trade name) G25 (*12) | 1 | — | — |
| | BEAULIGHT (trade name) ESS (*13) | 2 | — | — |
| | DEMOL (trade name) NL (*14) | 2 or more | 1 | — |
| Ampholytic surfactant | ENAGICOL (trade name) L-30AN (*15) | | — | — |
| | Water | | balance | balance |
| S/E | | | 0.2 | 0.1 |
| Fixing performance to coated paper | | | C | C |

Table 1 - LEGEND
(*1): Water dispersion liquid (containing resin dispersant) of carbon black, the numeral in Table 1 indicates the pigment solid content amount;
(*2): Water dispersion liquid (containing resin dispersant) of carbon black, the numeral in Table 1 indicates the pigment solid content amount;
(*3): Self-dispersible carbon black, produced by Cabot Corporation, the numeral in Table 1 indicates the pigment solid content amount;
(*4): Produced by Nissin Chemical Industry Co., Ltd., the numeral in Table 1 indicates the active ingredient amount (solid content amount);
(*5): Produced by Nissin Chemical Industry Co., Ltd., the numeral in Table 1 indicates the active ingredient amount (solid content amount);
(*6): Produced by Nissin Chemical Industry Co., Ltd., the numeral in Table 1 indicates the active ingredient amount (solid content amount);
(*7): Produced by Nissin Chemical Industry Co., Ltd., the numeral in Table 1 indicates the active ingredient amount (solid content amount);
(*8): Produced by Nissin Chemical Industry Co., Ltd., the numeral in Table 1 indicates the active ingredient amount;
(*9): Carboxylic acid type surfactant (sodium polyoxyethylene tridecyl ether acetate, $C_{13}H_{27}O[CH_2CH_2O]_3CH_2COONa$), produced by SANYO CHEMICAL INDUSTRIES, LTD., the numerals in Table 1 indicate the active ingredient amounts;
(*10): Carboxylic acid type surfactant (sodium polyoxyethylene lauryl ether acetate, $C_{12}H_{25}O[CH_2CH_2O]_3CH_2COONa$), produced by SANYO CHEMICAL INDUSTRIES, LTD., the numerals in Table 1 indicate the active ingredient amounts;
(*11): Sodium polyoxyethylene alkyl ether sulfate, produced by Lion Specialty Chemicals, Co., Ltd., the numeral in Table 1 indicates the active ingredient amount;
(*12): Sodium dodecylbenzenesulfonate (soft-type), produced by Kao Corporation, the numeral in Table 1 indicates the active ingredient amount;
(*13): Disodium polyoxyethylene alkyl (12 to 14) sulfosuccinate, produced by SANYO CHEMICAL INDUSTRIES, LTD., the numeral in Table 1 indicates the active ingredient amount;
(*14): a sodium salt of β-naphthalene sulfonic acid formalin condensate, produced by Kao Corporation, the numeral in Table 1 indicates the active ingredient amount;
(*15): N-lauroyl-N-methyl-β-alanine sodium, produced by Lion Specialty Chemicals, Co., Ltd., the numeral in Table 1 indicates the active ingredient amount.

As indicated in Table 1, in Examples 1 to 9, the evaluation results were satisfactory in relation to the fixing performance to coated paper. Focusing on Examples 5 to 7 using the same anionic surfactant, Examples 5 and 6 satisfying S/E=0.2 to 0.4 had the better fixing performance to coated paper than Example 7 satisfying S/E=0.6. Focusing on Examples 1 to 5, 8 and 9 using the anionic surfactants in the same amount, Examples 1 to 5 using the carboxylic acid type surfactants had the better fixing performance to coated paper than Examples 8 and 9 using the anionic surfactants other than the carboxylic acid type surfactants.

Comparative Example 1 in which no resin-dispersed pigment was used and only the self-dispersible pigment was used had a bad evaluation result of the fixing performance to coated paper. Comparative Example 2 using the vinyl chloride-acrylic copolymer emulsion having a glass transition temperature (Tg) of less than 50° C. had a bad evaluation result of the fixing performance to coated paper. Comparative Example 3 using no anionic surfactant and Comparative Example 4 using the ampholytic surfactant instead of the anionic surfactant had bad evaluation results of the fixing performance to coated paper. Comparative Example 5 using the anionic surfactant of which molecule contains two anion groups and Comparative Example 6 using the anionic surfactant of which molecule contains two or more anion groups had bad evaluation results of the fixing performance to coated paper. Comparative Example 7 in which S/E was less than 0.2 had a bad evaluation result of the fixing performance to coated paper.

With respect to the water-based inks of Examples 1 to 9 having good evaluation results for the fixing performance to coated paper, evaluation of resistance to water was conducted by the following method.

<Evaluation Method of Resistance to Water>

The surface of the application sample dried in the evaluation of fixing performance to coated paper was rubbed with a cotton swab wet with water from the application portion to the non-application portion. This was repeated until a white color that is a ground color of the coated paper appeared. The number of times of this process was evaluated in accordance with the following evaluation criterion.

<Evaluation of Resistance to Water and Evaluation Criterion>

A: No Peeling off was observed in the application portion until the surface of the application sample was rubbed at equal to or more than ten times, and the white ground color of the coated paper was not observed;

B: Peeling off was observed in the application portion until the surface of the application sample was rubbed at nine times, which causes the white ground color of the coated paper to be observed, but no practical issue was caused.

The water-based ink compositions and the evaluation results of evaluation of resistance to water in Examples 1 to 9 are indicated in Table 2.

TABLE 2

| | | | | Example | | | | | | | | |
|---|---|---|---|---|---|---|---|---|---|---|---|---|
| | | | | 1 | 2 | 3 | 4 | 5 | 6 | 7 | 8 | 9 |
| Water-based ink composition (% by weight) | Colorant | Pigment dispersion liquid A (*1) | | 5 | — | 5 | 5 | 5 | 5 | 5 | 5 | 5 |
| | | Pigment dispersion liquid B (*2) | | — | 5 | — | — | — | — | — | — | — |
| | Vinyl chloride-acrylic copolymer emulsion (E) | | Tg (° C.) | | | | | | | | | |
| | | VINYBLAN (trade name) 701 (*4) | 73 | 5 | 5 | — | — | 5 | 5 | 5 | 5 | 5 |
| | | VINYBLAN (trade name) 700 (*5) | 70 | — | — | 5 | — | — | — | — | — | — |
| | | VINYBLAN (trade name) 745 (*6) | 57 | — | — | — | 5 | — | — | — | — | — |
| | Humectant | Propylene glycol | | 25 | 25 | 25 | 25 | 25 | 25 | 25 | 25 | 25 |
| | Penetrant | Triethylene glycol-n-butyl ether | | 3 | 3 | 3 | 3 | 3 | 3 | 3 | 3 | 3 |
| | Nonionic surfactant | Olfine (trade name) E1010 (*8) | | 1 | 1 | 1 | 1 | 1 | 1 | 1 | 1 | 1 |
| | Anionic surfactant (S) | | Number | | | | | | | | | |
| | | BEAULIGHT (trade name) ECA (*9) | 1 | 1 | 1 | 1 | 1 | — | — | — | — | — |
| | | BEAULIGHT (trade name) LCA25N (*10) | 1 | — | — | — | — | 1 | 2 | 3 | — | — |
| | | SUNNOL (trade name) NL1430 (*11) | 1 | — | — | — | — | — | — | — | 1 | — |
| | | NEOPELEX (trade name) G25 (*12) | 1 | — | — | — | — | — | — | — | — | 1 |
| | Water | | | balance | balance | balance | balance | balance | balance | balance | balance | balance |
| S/E | | | | 0.2 | 0.2 | 0.2 | 0.2 | 0.2 | 0.4 | 0.6 | 0.2 | 0.2 |
| Resistance to water | | | | A | A | A | A | A | A | A | B | B |

Table 2 - LEGEND
(*1): Water dispersion liquid (containing resin dispersant) of carbon black, the numeral in Table 2 indicates the pigment solid content amount;
(*2): Water dispersion liquid (containing resin dispersant) of carbon black, the numeral in Table 2 indicates the pigment solid content amount;
(*4): Produced by Nissin Chemical Industry Co., Ltd., the numeral in Table 2 indicates the active ingredient amount (solid content amount);
(*5): Produced by Nissin Chemical Industry Co., Ltd., the numeral in Table 2 indicates the active ingredient amount (solid content amount);
(*6): Produced by Nissin Chemical Industry Co., Ltd., the numeral in Table 2 indicates the active ingredient amount (solid content amount);
(*8): Produced by Nissin Chemical Industry Co., Ltd., the numeral in Table 2 indicates the active ingredient amount;
(*9): Carboxylic acid type surfactant (sodium polyoxyethylene tridecyl ether acetate, $C_{13}H_{27}O[CH_2CH_2O]_3CH_2COONa$), produced by SANYO CHEMICAL INDUSTRIES, LTD., the numeral in Table 2 indicates the active ingredient amount;
(*10): Carboxylic acid type surfactant (sodium polyoxyethylene lauryl ether acetate, $C_{12}H_{25}O[CH_2CH_2O]_3CH_2COONa$), produced by SANYO CHEMICAL INDUSTRIES, LTD., the numerals in Table 2 indicate the active ingredient amounts;
(*11): Sodium polyoxyethylene alkyl ether sulfate, produced by Lion Specialty Chemicals, Co., Ltd., the numeral in Table 2 indicates the active ingredient amount;
(*12): Sodium dodecylbenzenesulfonate (soft-type), produced by Kao Corporation, the numeral in Table 2 indicates the active ingredient amount;

As indicated in Table 2, Examples 1 to 7 using the carboxylic acid type surfactants had the better resistance to water than Examples 8 and 9 using the anionic surfactants other than the carboxylic acid type surfactants.

As described above, the water-based ink of the present teaching can be fixed onto the coated paper at a low temperature in a short time. The way of use of the water-based ink of the present teaching is not limited to the ink-jet recording on the coated paper. The water-based ink of the present teaching is widely applicable to the ink-jet recording on various kinds of recording mediums, such as regular paper, glossy paper, and mat paper.

What is claimed is:

1. A water-based ink for ink-jet recording, comprising:
a resin-dispersed pigment;
an emulsion of a vinyl chloride-acrylic copolymer having a glass transition temperature of equal to or more than 50° C.;
an anionic surfactant having only one anion group in a molecule thereof; and
water,
wherein a blending amount (S) of the anionic surfactant in the entire amount of the water-based ink is in a range of 1 to 3% by weight, and
a ratio (S/E) of the blending amount (S) of the anionic surfactant to a solid content blending amount (E) of the emulsion of the vinyl chloride-acrylic copolymer in an entire amount of the water-based ink is equal to or more than 0.2.

2. The water-based ink for ink-jet recording according to claim 1, wherein the ratio (S/E) is in a range of 0.2 to 0.6.

3. The water-based ink for ink-jet recording according to claim 1, wherein the ratio (S/E) is in a range of 0.2 to 0.4.

4. The water-based ink for ink-jet recording according to claim 1, wherein the anionic surfactant is a carboxylic acid type surfactant.

5. The water-based ink for ink-jet recording according to claim 1, wherein the anionic surfactant has an oxyethylene group.

6. The water-based ink for ink-jet recording according to claim 1, wherein the anionic surfactant is polyoxyethylene alkyl ether acetate.

7. The water-based ink for ink-jet recording according to claim 1, wherein the glass transition temperature of the vinyl chloride-acrylic copolymer is equal to or less than 200° C.

8. The water-based ink for ink-jet recording according to claim 1, wherein the glass transition temperature of the vinyl chloride-acrylic copolymer is in a range of 57° C. to 73° C.

9. The water-based ink for ink-jet recording according to claim 1, further comprising propylene glycol and triethylene glycol-n-butyl ether.

10. An ink-jet recording method, comprising:
jetting the water-based ink according to claim 1 onto a recording medium in accordance with an ink-jet system; and
heating and drying a portion, of the recording medium, on which the water-based ink has been jetted.

11. The ink-jet recording method according to claim 10, wherein the recording medium is coated paper.

12. The ink-jet recording method according to claim 10, wherein the recording medium is heated at a temperature in a range of 0.2 to 4 times of the glass transition temperature of the vinyl chloride-acrylic copolymer.

13. The ink-jet recording method according to claim 10, wherein the recording medium is heated at a temperature in a range of 20 to 200° C.

14. A water-based ink for ink-jet recording, comprising:
a resin-dispersed pigment;
an emulsion of a vinyl chloride-acrylic copolymer having a glass transition temperature of equal to or more than 50° C.;
an anionic surfactant having only one anion group in a molecule thereof; and
water,
wherein a blending amount (S) of the anionic surfactant in the entire amount of the water-based ink is in a range of 0.6 to 2.4% by weight, and
a ratio (S/E) of the blending amount (S) of the anionic surfactant to a solid content blending amount (E) of the emulsion of the vinyl chloride-acrylic copolymer in an entire amount of the water-based ink is equal to or more than 0.2.

15. The water-based ink for ink-jet recording according to claim 14, wherein the anionic surfactant is a carboxylic acid type surfactant.

16. The water-based ink for ink-jet recording according to claim 14, wherein the anionic surfactant has an oxyethylene group.

17. The water-based ink for ink-jet recording according to claim 14, wherein the anionic surfactant is polyoxyethylene alkyl ether acetate.

18. The water-based ink for ink-jet recording according to claim 14, wherein the glass transition temperature of the vinyl chloride-acrylic copolymer is equal to or less than 200° C.

19. The water-based ink for ink-jet recording according to claim 14, wherein the glass transition temperature of the vinyl chloride-acrylic copolymer is in a range of 57° C. to 73° C.

20. The water-based ink for ink-jet recording according to claim 14, further comprising propylene glycol and triethylene glycol-n-butyl ether.

* * * * *